United States Patent [19]

Barthold et al.

[11] 4,324,675

[45] Apr. 13, 1982

[54] PROTECTIVE ADDITIVE FOR RADIATORS IN COOLANTS CONTAINING WATER

[75] Inventors: Klaus Barthold, Weinheim; Gert Liebold, Edingen, both of Fed. Rep. of Germany

[73] Assignee: BASF Aktiengesellschaft, Ludwigshafen, Fed. Rep. of Germany

[21] Appl. No.: 220,799

[22] Filed: Dec. 29, 1980

[30] Foreign Application Priority Data

Jan. 10, 1980 [DE] Fed. Rep. of Germany ....... 3000687

[51] Int. Cl.³ .............................................. C09K 5/00
[52] U.S. Cl. ....................................... 252/79; 252/73; 252/76; 252/390; 252/394; 252/396; 422/7; 422/16; 422/17

[58] Field of Search ..................... 252/79, 76, 73, 390, 252/394, 396; 422/7, 16, 17

[56] References Cited

U.S. PATENT DOCUMENTS 2,172,075  9/1939  Whaley.
2,182,612 12/1939  Eaton ................................ 252/76 X
2,817,636 12/1957  Barker .............................. 252/79 X
3,240,708  3/1966  Dulat et al. ....................... 252/79 X
4,241,016 12/1980  Hirozawa et al. ................ 252/76 X

*Primary Examiner*—Mayer Weinblatt
*Attorney, Agent, or Firm*—Andrew E. Pierce

[57] ABSTRACT

Alkylene glycol-based coolants free of nitrites, amines, and phosphates are metal corrosion inhibited with at least one nucleus-substituted benzoic acid and at least one conventional corrosion inhibitor for metals.

10 Claims, No Drawings

PROTECTIVE ADDITIVE FOR RADIATORS IN COOLANTS CONTAINING WATER

BACKGROUND OF THE INVENTION

1. Field of the Invention

The invention relates to coolants containing metal corrosion inhibitors useful in water-cooled internal combustion engines.

2. Description of the Prior Art

Prior art corrosion inhibitors for ethylene glycol based antifreeze compositions are primarily of three types, the alkali phosphate, sodium benzoate-sodium nitrite, and alkanolaminophosphate. Borax is frequently added for adjusting the reserve alkalinity and other conventional metal corrosion inhibitors are added such as the silicates, nitrates, benzotriazole and benzothiazole. Metal corrosion inhibitors based upon alkali metal phosphates are of no importance in Europe since they provide insufficient protection against corrosion for light metals in highly stressed engines. Inhibitors based upon sodium benzoate, which usually contain silicate and benzotriazole in addition to borax, are primarily used in Europe. Generally, these commerical products meet the technological requirement of the current market.

Metal corrosion inhibitors based on alkanolaminophosphates are used in some cases in Germany, but are preferred in England and in the Scandanavian Countries. Their drawback lies in the fact that they are incompatible with hard water, resulting in the precipitation of calcium phosphate. Corrosion protection of iron and its alloys in the presence of alkanolaminephosphates is insufficient when the engine is exposed to high thermal stresses as the result of precipitation of iron phosphate which causes a loss of heat transfer efficiency. Toxic nitroso compounds may result upon mixing nitrite and alkanolamine phosphates. One object of the invention is to provide coolants based on ethylene glycol that can be mixed with other coolants based on ethylene glycol. The inihibitor component in the coolant compositions of the invention contain neither nitrite, amines nor phosphate and yet the coolants of the invention display good resistance to metal corrosion.

Although prior art coolants without added nitrite inhibitors do not yet meet metal corrosion protection requirements, particularly when used with aluminum engine parts, it was surprisingly found that the replacement of sodium nitrite by derivates of benzoic acid having strongly electron-attracting groups results in coolants which meet metal corrosion requirements. The use of nitrophenols as inhibitor components is described in German application No. 14 92 522 and U.S. Pat. No. 2,197,774. However, This previous literature neither suggests the use of ntrobenzoic acids nor is an even approximately comparable effect obtained with nitrophenols.

SUMMARY OF THE INVENTION

The invention concerns anticorrosive additives for aqueous liquids and coolants or anitfreeze compositions for use in contact with metals present in the cooling system of water-cooled internal combustion engines. The coolants are based on an aqueous glycol solution, for instance, ethylene glycol or propylene glycol and which are free of nitrites, amines and phosphates. They preferably contain about 0.05 to about 5 percent by weight, relative to the glycol, of at least one nucleus-substituted benzoic acid having a pKa value of less than 3. These include, for instance, nitro and halogen substituents on the ring of benzoic acid. Preferred among these are the nitrobenzoic acids and particularly the ortho- and para-nitrobenzoic acids. These acids are most preferably added in quantities of about 0.5 to about 2.5 percent by weight relative to the glycol to provide excellent corrosion protection. It has been determined that the aromatically bonded nitro group is chemically stable. When mixed with coolants containing alkanolaminophosphate, this material does not result in nitrosamines.

DETAILED DESCRIPTION OF THE INVENTION

The coolant concentrates of the invention contain an effective amount of at least one nucleus-substituted benzoic acid together with an effective corrosion inhibiting amount of at least one conventional metal corrosion inhibitor in an ethylene glycol or propylene glycol base. Useful conventional metal corrosion inhibitors include alkali metal benzoates, alkali metal silicates, borax, alkali metal benzotriazole and alkali metal benzothiazole. The coolant compositions of the invention are free of nitrates, amines and phosphates, for instance alkali metal nitrites and alkanolamine phosphate.

The nucleus-substituted benzoic acids which are useful as metal corrosion inhibitors in the coolants of the invention are those having a pKa value of less than 3. Examples of useful substituted benzoic acids are the nitro- and halogen-substituted benzoic acids, particularly useful are the ortho- and para-nitrobenzoic acids. Generally the substituted benzoic acids are present in the proportion of about 0.5 to about 5.0 percent by weight based upon the weight of the ethylene or propylene glycol component. Preferably about 0.5 to about 2.5 percent by weight is used.

The corrosion behavior of the new formulations was tested according to ASTM D-1384-70, incorporated herein by reference, as well as by a modified so-called "hot-finger" test according to British Standard 5117, incorporated herein by reference, and was compared with the products of Examples 1 through 5 listed below. In the hot-finger test, a 20-25 volume percent solution of the radiator protecting agent in water is heated to 130° C. under pressure for 120 hours. In each case, the water used for diluting purposes contained 100 ppm chloride, sulfate, and bicarbonate. The liquid was heated by two metal fingers each having a surface of 60 square centimeters and containing a 400 watt heating cartridge. The hot fingers consist of $AlCuMg_2$ and cast iron. The flask contained the ASTM metals as well as, AlMn, AlSi12, AlSi10 Mg.

The following examples illustrate the various aspects of the invention but are not intended to limit its scope. Where not otherwise specified throughout this specification and claims, temperatures are given in degrees centrigade and parts, percentages and proportions are by weight. Examples, according to this invention, were compared with the following prior art coolants.

EXAMPLE 1

(control, forming no part of this invention)

A coolant concentrate according to the specifications of British Standard 3151, incorporated herein by reference, with an inhibitor system based upon sodium benzoate/sodium nitrite.

EXAMPLE 2
(control)

The coolant concentrate according to the specifications of British Standard 3152, incorporated herein by reference, with an inhibitor system based upon triethanolaminephosphate.

EXAMPLE 3
(control)

The coolant concentrate according to Example 1 of German application No. 14 92 522, incorporated herein by reference.

EXAMPLE 4
(control)

The coolant according to U.S. Pat. No. 2,197,774, incorporated herein by reference, Formula I. Proportions are in percent in weight.
0.5 picric acid
0.3 ammonium molybdate
0.5 sodium carbonate
0.3 sodium nitrate
98.4 ethylene glycol

EXAMPLE 5
(control)

A commercially available coolant based upon benzoate/nitrite was obtained. Proportions are in percent by weight.
5.0 sodium benzoate
0.5 sodium nitrite
94.5 ethylene glycol

EXAMPLE 5a
(control)

A second sample of the coolant of Example 5 was obtained from a different source.

EXAMPLE 6

A coolant was prepared according to this invention as follows: (The proportions are in parts by weight.)

| | |
|---|---|
| 1.0 | p-nitrobenzoic acid |
| 2.5 | sodium benzoate |
| 1.4 | borax . 10 H$_2$O |
| 0.05 | sodium silicate . 5 H$_2$O |
| 0.1 | sodium nitrate |
| 94.9 | ethylene glycol |
| 99.95 | |

EXAMPLE 7

A coolant of the invention was prepared. (Proportions are in parts by weight.)

| | |
|---|---|
| 2.0 | p-nitrobenzoic acid |
| 3.0 | sodium benzoate |
| 0.7 | borax . 10H$_2$O |
| 0.05 | sodium silicate . 5 H$_2$O |
| 0.05 | sodium nitrate |
| 0.07 | benzotriazole |
| 94.15 | ethylene glycol |
| 100.02 | |

EXAMPLE 8

A coolant of the invention was prepared. (Proportions are in percent by weight.)

| | |
|---|---|
| 0.05 | o/p-nitrobenzoic acid (1:1) |
| 2.5 | sodium benzoate |
| 2.0 | borax . 10H$_2$O |
| 0.05 | potassium silicate |
| 0.1 | NaNO$_3$ |
| 2.0 | water |
| 93.70 | ethylene glycol |
| 100.00 | |

TABLE I

Corrosion Tests according to ASTM D 1384-70
Concentration of the radiator protection agent in water: 33 volume percent. Loss (−) or gain (+) in weight in milligrams per square centimeter.

| Example | Copper | Solder | Brass | Steel | Cast Iron | Cast Aluminum |
|---|---|---|---|---|---|---|
| 1 | −0.06 | −0.20 | −0.02 | −0.01 | +0.03 | +0.22 |
| 2 | −0.05 | −0.25 | −0.03 | −0.01 | +0.03 | −0.10 |
| 3 | −0.46 | +0.06 | −0.30 | +0.04 | +0.03 | −0.30 |
| 4 | −0.15 | −0.01 | −0.17 | −0.01 | +0.02 | −0.32 |
| 5 | −0.01 | −0.04 | −0.01 | −0.01 | −0.01 | −0.06 |
| 5a | −0.01 | −0.09 | −0.16 | ±0.00 | −0.58 | +0.02 |
| 6 | −0.07 | −0.03 | −0.06 | −0.01 | +0.07 | +0.02 |
| 7 | ±0.00 | ±0.00 | −0.03 | +0.01 | +0.04 | +0.02 |
| 8 | −0.08 | +0.01 | ±0.00 | +0.02 | −0.07 | −0.30 |

TABLE II

Corrosion tests according to ASTM D 1384-70
Concentration of the coolant concentrate in water: 20 volume percent. Loss (−) or gain (+) in weight in milligrams per square centimeter

| Example | Copper | Solder | Brass | Steel | Cast Iron | Cast Aluminum |
|---|---|---|---|---|---|---|
| 1 | −0.12 | −0.50 | −0.06 | −0.08 | 0.10 | −0.20 |
| 2 | −0.10 | −0.65 | −0.08 | −0.10 | +0.10 | −0.18 |
| 3 | −0.80 | −0.25 | −0.45 | +0.06 | +0.06 | −0.65 |
| 4 | −0.42 | −0.08 | −0.32 | −0.12 | +0.08 | −1.10 |
| 5 | −0.01 | −0.04 | −0.01 | −0.01 | −0.78 | −0.75 |
| 5a | −0.01 | −0.19 | −0.36 | ±0.00 | −1.12 | −0.52 |
| 6 | ±0.00 | −0.01 | ±0.00 | −0.05 | −0.21 | +0.03 |
| 7 | ±0.00 | −0.07 | −0.17 | ±0.00 | +0.03 | −0.09 |
| 8 | −0.13 | ±0.00 | −0.28 | −0.14 | −0.32 | −0.29 |

TABLE III

Hot Finger Test According to British Standard 5117

| Example | Copper | Solder | Brass | Steel | Cast Iron | Cast Aluminum | AlMn | AlSi12 | AlSi10Mg |
|---|---|---|---|---|---|---|---|---|---|
| (A) 25 Volume percent solution of the coolant concentrate in ASTM water. | | | | | | | | | |
| 1 | +0.03 | −0.10 | −0.08 | −0.04 | −0.10 | −0.12 | −0.15 | −0.20 | −0.18 |
| 5 | +0.03 | −0.02 | −0.07 | −0.05 | −0.02 | −0.01 | −0.01 | −0.02 | −0.02 |
| 6 | +0.01 | −0.01 | −0.05 | −0.02 | −0.01 | −0.01 | −0.01 | −0.02 | −0.02 |
| 7 | +0.01 | −0.01 | −0.03 | −0.02 | −0.01 | −0.01 | −0.01 | −0.02 | −0.02 |
| 8 | +0.03 | −0.02 | −0.05 | −0.02 | −0.01 | +0.02 | +0.01 | −0.02 | −0.04 |
| (B) 20 Volume percent solution of the coolant concentrate in ASTM water. | | | | | | | | | |

TABLE III-continued

| Hot Finger Test According to British Standard 5117 | | | | | | | | |
|---|---|---|---|---|---|---|---|---|
| Example | Copper | Solder | Brass | Steel | Cast Iron | Cast Aluminum | AlMn | AlSi12 | AlSi110Mg |
| 1 | −0.10 | −0.30 | −0.12 | −0.08 | −0.18 | −0.20 | −0.22 | −0.28 | −0.25 |
| 5 | −0.10 | −0.20 | −0.04 | −0.25 | −0.04 | −0.10 | −0.10 | −0.15 | −0.15 |
| 6 | −0.10 | −0.05 | −0.04 | −0.12 | −0.04 | −0.04 | 0.08 | 0.10 | −0.10 |
| 7 | −0.10 | +0.05 | −0.04 | −0.09 | −0.04 | −0.04 | −0.05 | −0.09 | −0.08 |
| 8 | −0.08 | −0.05 | −0.04 | −0.15 | −0.06 | −0.06 | −0.10 | −0.12 | −0.13 |

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. An anticorrosive additive free of nitrites, amines, and phosphates for use in an aqueous solution to inhibit the corrosion of metals present in the cooling system of a water-cooled internal combustion engine consisting essentially of in admixture
   (A) an effective corrosion inhibiting amount of at least one conventional corrosion inhibitor for metals and
   (B) an effective corrosion inhibiting amount of at least one nucleus-substituted benzoic acid having strongly electron-attracting groups and a pKa of less than 3 selected from the group consisting of the halogen-ring-substituted benzoic acids.

2. The composition of claim 1 wherein said conventional corrosion inhibitor is selected from the group consisting of at least one of alkali metal benzoates, silicates, nitrates, benzotriazoles, benzothiazoles, and borax, and said aqueous solution is an aqueous glycol solution.

3. A corrosion inhibited aqueous liquid free of nitrites, amines and phosphates for use in contact with metals present in the cooling system of a water-cooled internal combustion engine consisting essentially of in admixture
   (A) an effective corrosion inhibiting amount of at least one conventional corrosion inhibitor for metals and
   (B) an effective corrosion inhibiting amount of at least one nucleus-substituted benzoic acid having strongly electron-attracting groups and having a pKa value of less than 3 selected from the group consisting essentially of the halogen-ring-substituted benzoic acids.

4. The composition of claim 3 wherein said aqueous liquid is an aqueous glycol solution selected from the group consisting of at least one of ethylene glycol and propylene glycol.

5. The composition of claim 4 wherein said conventional corrosion inhibitor is selected from the group consisting of at least one of the alkali metal benzoates, silicates, nitrates, benzotriazoles, benzothiazoles, and borax.

6. A corrosion inhibited glycol-based antifreeze concentrate composition free of nitrites, amines, and phosphates for use upon dilution with water in the cooling system of a water-cooled internal combustion engine consisting essentially of, in admixture, a glycol, an effective corrosion inhibiting amount of a conventional corrosion inhibitor for metals, and an effective corrosion inhibiting amount of at least one nucleus-substituted benzoic acid having strongly electron-attracting groups and having a pKa value of less than 3 selected from the group consisting essentially of the halogen-ring-substituted benzoic acids.

7. The composition of claim 6 wherein said glycol is selected from the group consisting of at least one of ethylene and propylene glycol.

8. The composition of claim 7 wherein said conventional corrosion inhibitor is selected from the group consisting of at least one of the alkali metal benzoates, silicates, nitrates, benzotriazoles, benzothiazoles, and borax cooled internal combustion engine consisting essentially of in admixture
   (A) an effective corrosion inhibiting amount of at least one conventional corrosion inhibitor for metals and
   (B) an effective corrosion inhibiting amount of at least one nucleus-substituted benzoic acid having strongly electron-attracting groups and a pKa of less than 3 selected from the group consisting of the halogen-ring-substituted benzoic acids.

9. A process for inhibiting the corrosion of metals present in the cooling system of a water-cooled internal combustion engine in contact with an aqueous liquid, free of nitrites, amines, and phosphates, said process comprising adding to said liquid an effective corrosion inhibiting amount of
   (A) at least one conventional corrosion inhibitor for metals and
   (B) at least one nucleus-substituted benzoic acid having strongly electron-attracting groups and having a pKa value of less than 3 selected from the group consisting essentially of the halogen-ring-substituted benzoic acids.

10. The process of claim 9 wherein said aqueous liquid comprises an aqueous glycol solution and wherein said conventional corrosion inhibitor is selected from the group consisting of at least one of the alkali metal benzoates, silicates, nitrates, benzotriazoles, benzothiazoles, and borax.

* * * * *

UNITED STATES PATENT AND TRADEMARK OFFICE
CERTIFICATE OF CORRECTION

PATENT NO. : 4,324,675

DATED : April 13, 1982

INVENTOR(S) : Klaus Barthold & Gert Liebold

It is certified that error appears in the above—identified patent and that said Letters Patent is hereby corrected as shown below:

Column 6, Claim 8, line 5 beginning with the word "cooled," delete remainder of claim.

Signed and Sealed this

Twenty-second Day of June 1982

[SEAL]

Attest:

Attesting Officer

GERALD J. MOSSINGHOFF

Commissioner of Patents and Trademarks